United States Patent [19]

Veronesi

[11] Patent Number: 4,788,033
[45] Date of Patent: Nov. 29, 1988

[54] CALANDRIA

[75] Inventor: Luciano Veronesi, O'Hara Township, Allegheny County, Pa.

[73] Assignee: Westinghouse Electric Corp., Pittsburgh, Pa.

[21] Appl. No.: 490,059

[22] Filed: Apr. 29, 1983

[51] Int. Cl.$^4$ .............................................. G21C 1/04
[52] U.S. Cl. .................................... 376/353; 376/377; 376/389; 376/399
[58] Field of Search ............... 376/290, 352, 353, 377, 376/389, 399, 406

[56] References Cited

U.S. PATENT DOCUMENTS

| | | | |
|---|---|---|---|
| 2,982,713 | 5/1961 | Sankovich et al. | 376/353 |
| 2,990,349 | 6/1961 | Roman | 376/444 |
| 3,205,144 | 9/1965 | Jabsen | 376/353 |
| 3,481,832 | 12/1969 | Rickert | 376/353 |
| 3,816,245 | 6/1974 | Bevilacqua | 376/353 |
| 4,072,563 | 2/1978 | McDonald et al. | 376/353 |
| 4,173,513 | 11/1979 | Obermeyer et al. | 376/353 |
| 4,659,539 | 4/1987 | Kimbrell et al. | 376/377 |
| 4,716,013 | 12/1987 | Veronesi et al. | 376/353 |

Primary Examiner—Charles T. Jordan
Assistant Examiner—Richard W. Wendtland
Attorney, Agent, or Firm—H. Diamond

[57] ABSTRACT

A calandria for use in conducting the hot coolant of a nuclear reactor transversely. The calandria includes an upper plate and a lower plate which support tubes. The plates and tubes are enclosed in a shell which extends above the upper plate and has a supporting flange. The lower plate has holes for transmitting coolant into the region between the plates. The shell has openings whose boundaries mate with the outlet nozzles of the reactor. The tubes are of stainless steel and are dimensioned so that they have mass, stiffness and strength such that they are not subject to failure by the transverse flow of the coolant even at a high velocity.

8 Claims, 5 Drawing Sheets

CALANDRIA

REFERENCE TO RELATED APPLICATION

Application Ser. No. 490,099 filed concurrently herewith to Luciano Veronesi and Dan C. Garner for Nuclear Reactor (herein Veronesi et al), assigned to Westinghouse Electric Corporation, is incorporated herein by reference.

BACKGROUND OF THE INVENTION

This invention relates to nuclear reactors and has particular relationship to calandrias for use in nuclear reactors. Veronesi et al discloses a nuclear reactor in which the coolant flowing through the upper internals is conducted to the outlet nozzles through a calandria which is at the level of the nozzles. It is desirable that the calandria be a unit readily installed in, and removable from, the nuclear reactor. The calandria should include facilities for locating and positioning the control-rod guides at their upper ends radially with respect to the reactor. It is necessary that the calandria provide guidance for the drive rods for the control rods between the top of the rod guides and the head of the pressure vessel of the reactor and facilitate the insertion of the drive rods into the guides. The drive rods should be protected from the transverse flow of the coolant. The calandria should provide structural support for the drive line during a loss-of-coolant accident (LOCA) and insure that the control rods will be capable of being inserted in the core during LOCA events. It is an object of this invention to provide a calandria which, while suitable for other purposes, is uniquely suitable for use in a reactor, such as that disclosed in Veronesi et al, wherein the calandria is mounted above the upper internals, and meets the above-listed requirements.

SUMMARY OF THE INVENTION

In accordance with the invention there is provided a calandria including an upper plate and a lower plate. Between these plates a plurality of hollow members are mounted. The hollow members are composed of stainless steel and are diminished so that they have a mass, stiffness and strength, not only to preclude their failure by reason of the transverse flow of the coolant, but also, on the occurrence of a LOCA event, to preclude failure or deformation of the drive rods under the high pressures of the resulting steam. The hollow members are open to the region above the upper plate and to the region below the lower plate. The drive rods for the control rods pass through these hollow members. The plates and the hollow members are bounded by a shell having a mounting flange at the top. The shell has holes formed to be part of a succession of surfaces which mate with the outlet nozzles. While the calandria which is the subject of this invention is uniquely suitable for use in nuclear reactors, it is conceivable that it may have more general application. To the extent that such application may exist, it is regarded as within the scope of equivalents this invention.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF THE EMBODIMENTS

Figure 2:
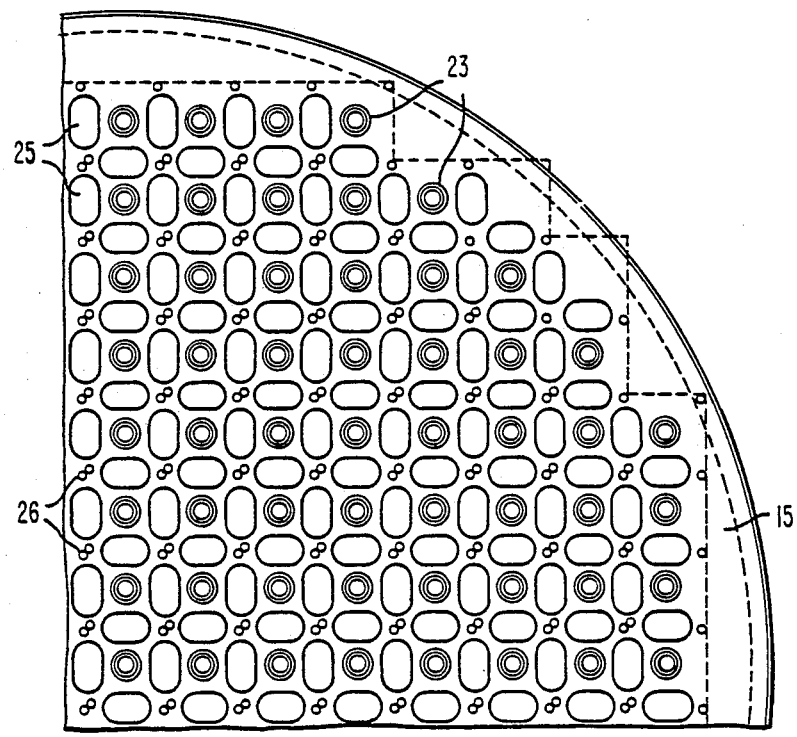
FIG. 2 is a fragmental plan view of this calandria taken in the direction II—II of FIG. 1.
Figure 4:
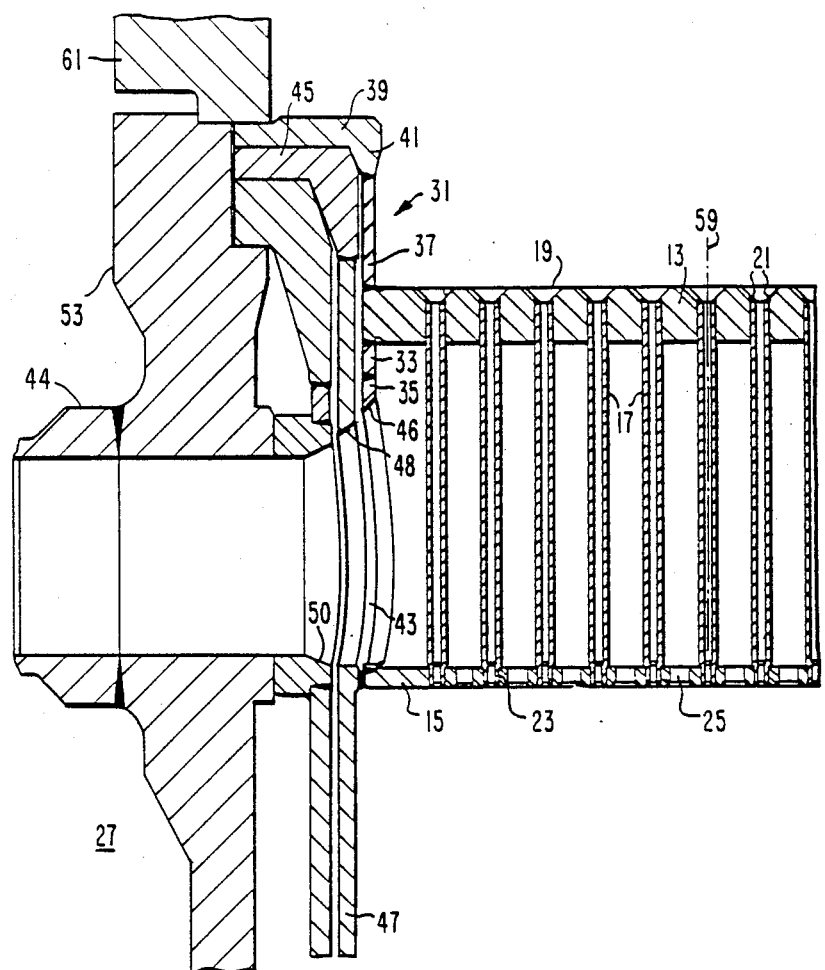
FIG. 4 is a fragmental view in longitudinal section of this calandria and of a part of a pressure vessel to which it is joined.

The apparatus shown in the drawings is a calandra 11 including an upper supporting plate 13 and a lower supporting plate 15. The plates 13 and 15 support hollow members 17, typically hollow tubes, which extend between coaxial holes in the plates. Each hole is countersunk in the upper surface of the plate 13 at 19 (FIG. 4) and each member 17 is joined by a weld 21 along the inner rim of the countersunk groove. The holes in the lower plate 15 are threaded and the lower end 23 of each member 17 is screwed into a hole in the lower plate (FIGS. 2, 4). The lower plate 15 has two sets of additional holes, large racetrackshaped holes 25 and smaller circular holes 26. In its customary use the calandria 11 is mounted on the upper internals of a reactor 27 (FIG. 4), as disclosed in Veronesi et al and is aligned with the upper internals (not shown) and serves as upper support for the control-rod guides. The racetrack-shaped holes 25 serve to transmit the coolant from the upper internals into the calandria 11 and the smaller holes 26 are engaged by alignment pins (not shown) to align the control-rod guides.

The plates 13 and 15 and the hollow members 17 are enclosed in a shell 31. A typical such shell 31, which is of composite structure, is shown in section in FIG. 4. This shell 31 includes a narrow cylindrical strip 33 and a wider cylindrical strip 35. The narrow strip 33 is welded to the upper plate 13 at one end and to the wider strip 35 at the opposite end. The wider strip is joined to the bottom of the lower plate 15 at its opposite end. Above the plate 13 the shell 31 includes a cylindrical strip 37 and a flange 39 having a projecting ring 41. The strip 37 is welded to the ring 41 at one end and to the top of the plate 13 at the opposite end. The lower strip 35 has holes 43 for conducting coolant to the outlet nozzles 45 of the reactor 27 in which the calandria is installed. The boundaries 46 of the holes are formed to mate with the boundaries 48 of the holes in the inner barrel 47 which in turn are formed to mate with the runs 50 of the nozzles 45 so that by-pass leakage from the inlet nozzles directly through the outlet nozzls is minimized FIG. 4.

Figure 1:
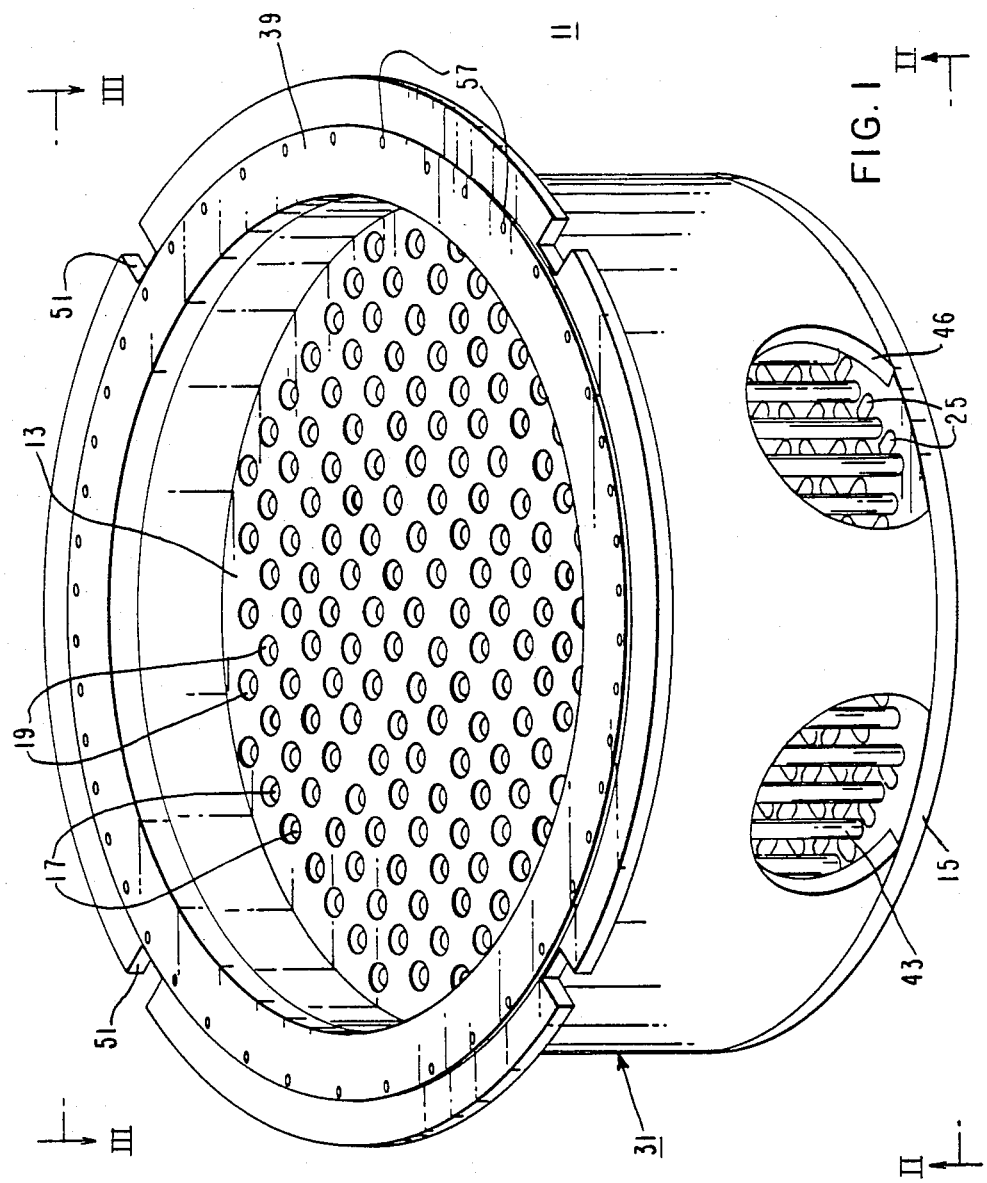
FIG. 1 is a view in isometric of a calandria in accordance with this invention.
Figure 3:
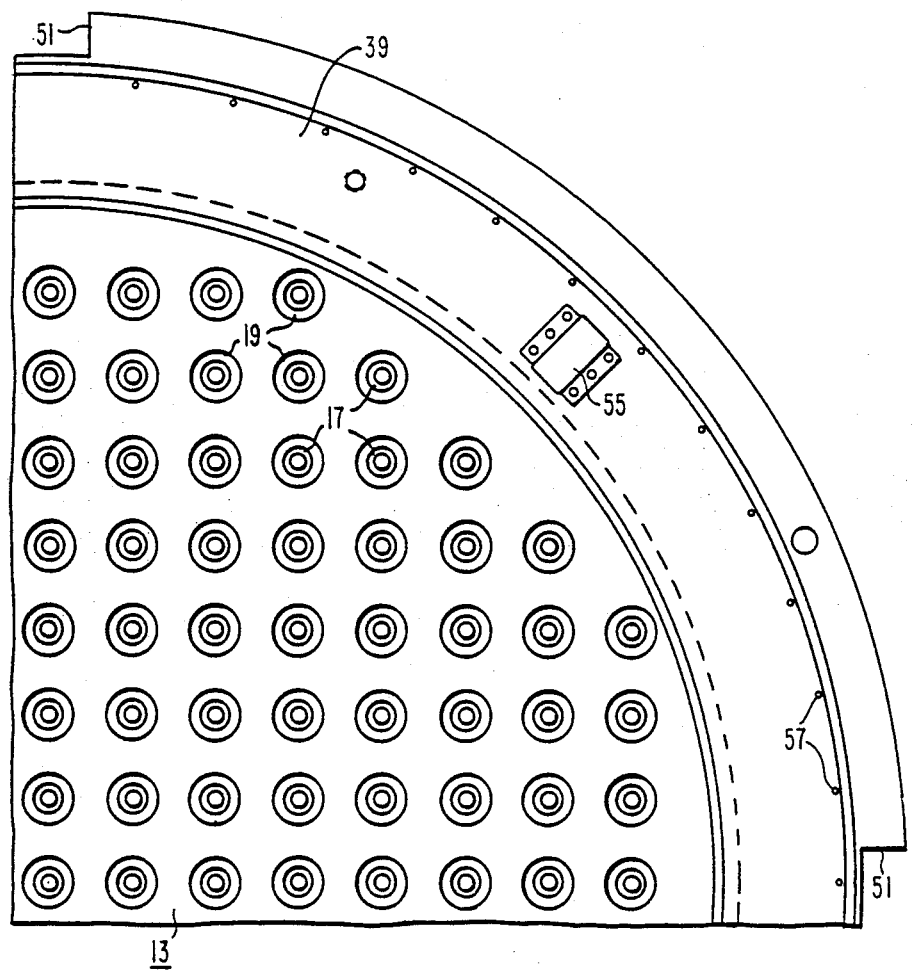
FIG. 3 is a fragmental view of this calandria taken in the direction III—III of FIG. 1.

In the reactor the calandria 11 is mounted with its flange 39 seated on the flange 45 of the inner barrel 47 of the reactor (FIG. 4). The flange 39 is provided with key ways 51 (FIGS. 1, 3) for keys (not shown) extending from the body 53 of the reactor 27. The flange 39 is also provided with rectangular slots 55 (FIG. 3). Keys (not shown) projecting from flange 45 engage these slots. So that the calandria may be appropriately centered, shims (not shown) are bolted adjacent the slots 55. The flange 39 is also provided with holes 57 around its periphery. Coolant from the downcomer 58 shown in Veronesi et al. which penetrates through openings in the inner barrel flange 45 shown in Veronesi et al. is conducted through these holes. This coolant circulates from the holes 57 onto plate 13 and thence through the spaces between the hollow members 17 and the drive rods 59, which pass through these hollow members 17.

The calandria 11 is mounted and centered on the reactor 27 as a separate unit. It is readily removable affording access to the guides and clusters (not shown) of the reactor. The relationship of the calandria 11 to the reactor 27 is described in more detail in Veronesi et al.

Typically each hollow members 17 has an outside diameter of $3\frac{1}{2}$ inches, an inside diameter of $2\frac{1}{4}$ inches and a length of 50 inches. The diameter of a drive rod 59 is $1\frac{3}{4}$ inches. The pitch of the members 17 is 10 inches. Each hole 25 has opposite parallel sides 2 inches long, spaced 4 inches apart, each set terminating at their ends in a semi-circular section having a radius of 2 inches. The overall dimension of the holes is 6 inches along the center line between the circumferences of the semi-circular sections by 4 inches wide. Each alignment hole 26 has a diameter of $1\frac{1}{8}$ inch.

The 50-inch long members 17 provide effective guidance for the drive rods between the top of the control-rod guide and the head 61 (FIG. 4) of the vessel and they facilitate the insertion of the drive rods into the guides where the control rods are moving downwardly. The drive rods 59 are protected from transverse flow by the members 17. The calandria 11 and particularly the members 17 provide structural support for the drive rods during a loss-of-coolant accident where there is a large break in the piping. In this case steam having a high velocity is projected outwardly towards the outlet nozzle 46 of the reactor 27. The steam would tend to deform and rupture the drive rods just when they are needed to insert the RCC's into the core. The drive rods are protected from deformation and rupture by the members 17.

The most significant function which the calandria 11 performs when it is integrated into a reactor as described in Veronesi et al is that it directs the core outlet flow from the rod-guide region to the outlet 62 with a minimum of pressure loss. The pitch-to-cross sectional dimension of the members 17 (pitch to outer diameters where the members 17 are tubes) is high, typically 10/3.5 or 2.85, and this high ratio contributes to maintenance of low pressure drop. The size of the racetrack holes 25 (typical area 20.56 inches) is selected so as to produce nearly uniform core outlet flow into the calandria 11. The calandria performs a flow-control function and thus prevents major core-flow maldistribution and excessive transverse flow. The calandria also aids in maintaining the temperature of the region of the head 61 of the reactor at or near the temperature of the inflowing cold coolant. The calandria 11 isolates the main core outlet flow from the region of the head. This, combined with the small head-cooling flow from the downcomer which enters through the holes 57 in the flange 39, maintains the head region at core inlet temperature. This head-cooling flow exits through the annulus passages in the members 17 between the drive rods 59 and the inner surfaces of the hollow members. The calandria then provides a controlled outlet flow path for the head-cooling flow.

Figure 5:
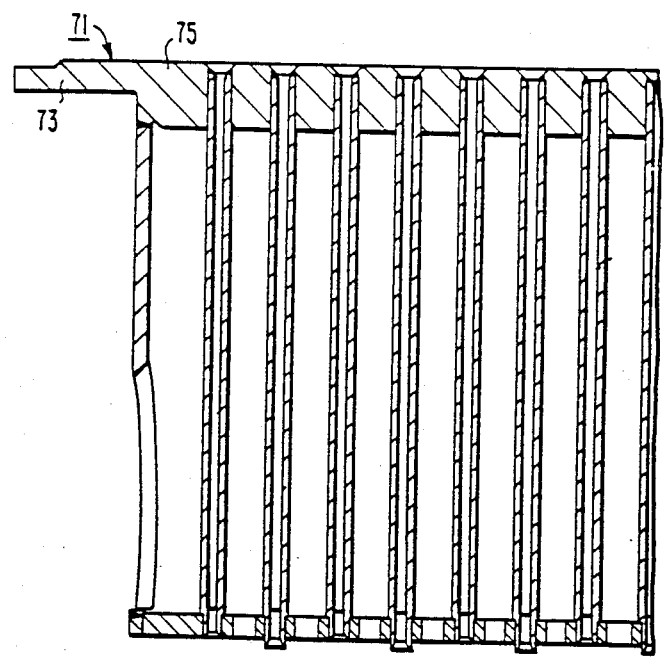
FIGS. 5 and 6 are fragmental views in longitudinal section showing modifications of this invention.
Figure 6:
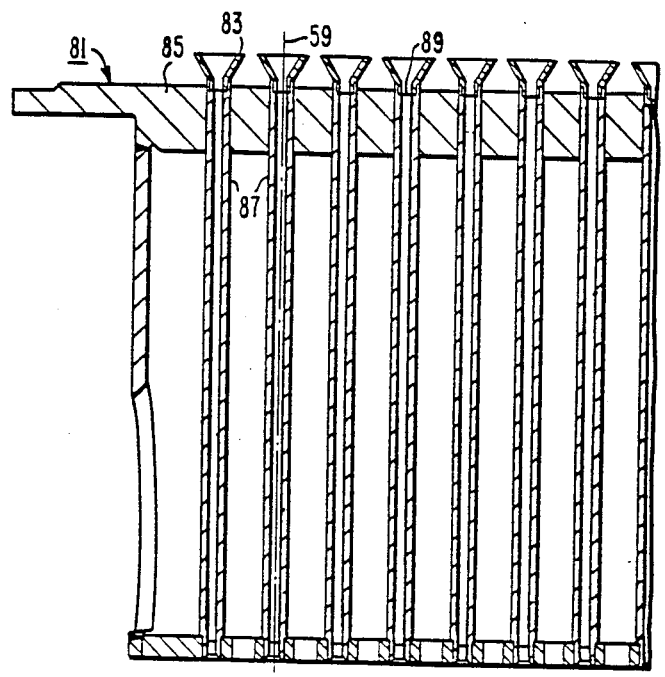

While preferred embodiments of this invention have been disclosed herein, many modifications thereof are feasible. For example, the flange of the calandria may be formed to be bolted to the flange 45 of the inner barrel 47 and the members 17 may be welded to the lower plate 15 as well as to the upper plate 13. Also a calandria 71 (FIG. 5) may be provided in which the flange 73 extends from the upper supporting plate 75. This calandria 71 may be of lower cost than the calandria 11 shown in FIG. 4. A calandria 81 (FIG. 6) may also be provided in which there are funnels 83 above the upper plate 85 to aid the insertion of the drive rods 59. In this case the funnels 83 are separate units. The hollow members 87 are welded to the top of the plate 85. Then the funnels 83 are welded to the joint 89 of the hollow member and the plate. The joining of the hollow members 87 to the plate 85 is thus faciliated. This invention is not to be restricted except insofar as is necessitated by the spirit of the prior art.

I claim:

1. In a nuclear reactor which in operation has a coolant flowing therethrough and includes at least one outlet nozzle through which said coolant flows out of said reactor, a calandria disposed therein, said calandria including, as an integrated unit which may be readily installed in, or be removed from, said reactor as a separate piece, an upper support plate, a lower support plate, a plurality of hollow members supported between said plates, a shell interposed between said plates enclosing said hollow members, said plates being open in the areas where they are connected to said hollow members, said lower plate having openings externally to said hollow members permitting the inflow of coolant to the region bounded by said plates and said shell external of said hollow members, and said shell having, in a region thereof, at least one opening lateral of said hollow members positioned for direct communication with said outlet nozzle to direct the outflow of said coolant, transversely of said hollow members, from the volume bounded by said plates and said shell each said hollow member being dimensioned to have a mass, stiffness and strength to preclude failure by reason of transverse flow of coolant and also on the occurrence of a loss-of-coolant event.

2. The calandria of claim 1, wherein the shell extends above the upper plate and includes a flange for connection to the reactor.

3. The calandria of claim 2 in a reactor which has a head, the flange being positioned adjacent to, and under, the head, wherein the flange is perforated to permit the flow of coolant therethrough to the region of the head to maintain the region of the head at core-inlet temperature.

4. The calandria of claim 2 in a reactor having a vessel provided with keys, wherein the flange of the calandria has key ways for receiving keys for securing the calandria to the vessel of the reactor.

5. The calandria of claim 1 wherein the boundary of the opening in the shell of the outflow of coolant is formed to mate with the rim of the outlet nozzle of the nuclear reactor so that the outflow of coolant is concentrated in the outflow channel of the nuclear reactor.

6. The calandria of claim 1 in a reactor having control rods and upper intervals including guides for the control rods wherein, in addition to the openings permitting the inflow of coolant, the lower plate of the calandria has openings for receiving alignment pins for the guides of the reactor.

7. The calandria of claim 1 wherein the ratio of the pitch of the hollow members to the cross dimension of the hollow members is high so that the pressure drop of the coolant in the calandria is low and ready transverse flow of the coolant is permitted.

8. In a nuclear reactor which in operation has a coolant flowing therethrough and includes at least one outlet nozzle through which the coolant flows out of the reactor, a calandria disposed in said reactor, said calandria including, as an integrated unit which may be readily installed in, or removed from, said reactor, an upper support plate, a lower support plate, a plurality of hollow members supported between said plates, a shell interposed between said plates enclosing said hollow members extending into said plates and being open to the regions above and below said plates, said lower plate having openings external to said hollow members permitting the inflow of coolant to the region bounded by said plates and said shell but external to said hollow members, and said shell having in a region thereof at least one opening transverse to said hollow members for the outflow of said coolant directly through said nozzle from the region bounded by said plates and said shell, each hollow member being dimensioned to have a mass, stiffness, and strength to preclude failure by reason of transverse flow of coolant and also on the occurence of a loss-of-coolant event.

* * * * *